(12) United States Patent
Inui

(10) Patent No.: US 11,180,331 B2
(45) Date of Patent: Nov. 23, 2021

(54) SHEET FEEDING APPARATUS AND IMAGE FORMING APPARATUS

(71) Applicant: CANON KABUSHIKI KAISHA, Tokyo (JP)

(72) Inventor: Yuma Inui, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 167 days.

(21) Appl. No.: 16/414,930

(22) Filed: May 17, 2019

(65) Prior Publication Data
US 2019/0367302 A1  Dec. 5, 2019

(30) Foreign Application Priority Data

Jun. 5, 2018  (JP) .............................. JP2018-108092

(51) Int. Cl.
*B65H 3/06* (2006.01)
*B65H 3/52* (2006.01)
*F16D 1/10* (2006.01)

(52) U.S. Cl.
CPC ........... *B65H 3/0669* (2013.01); *F16D 1/101* (2013.01); *B65H 2403/73* (2013.01)

(58) Field of Classification Search
CPC ............... B65H 3/0669; B65H 3/5261; B65H 2403/73; B65H 2402/633; F16D 1/101;
(Continued)

(56) References Cited

U.S. PATENT DOCUMENTS 5,040,779 A *  8/1991 Ogiri ..................... B65H 3/0669
  271/109
5,501,542 A *  3/1996 Hall, Sr. ................. F16D 1/101
  209/369
(Continued)

FOREIGN PATENT DOCUMENTS

CN   203187142 U   9/2013
CN   103738750 A   4/2014
(Continued)

OTHER PUBLICATIONS

Chinese Office Action dated Nov. 26, 2020, in related Chinese Patent Application No. 201910465784.8 (with English translation).
(Continued)

*Primary Examiner* — Luis A Gonzalez
(74) *Attorney, Agent, or Firm* — Venable LLP

(57) ABSTRACT

A sheet feeding apparatus includes a sheet conveyance roller, a retard roller to contact the conveyance roller and separate sheets one by one, a drive input shaft, a retard shaft, and a joint to connect the retard shaft with the drive input shaft and transmit rotary drive force of the drive input shaft to the retard shaft. A first angle formed between a line passing through a first engagement position and the drive input shaft and a line passing through a second engagement position and the retard shaft center is within a range of 80 degrees or greater and 100 degrees or smaller, and a second angle formed between a line passing through the drive input shaft and a first pin axis and a line passing through the retard shaft and a second pin axis is within a range of 50 degrees or greater and 70 degrees or smaller.

8 Claims, 12 Drawing Sheets

(58) Field of Classification Search
CPC ....... F16D 1/02; F16D 3/2052; G03G 21/186; G03G 21/1647
See application file for complete search history.

(56) References Cited

U.S. PATENT DOCUMENTS

| | | | |
|---|---|---|---|
| 6,206,368 | B1 | 3/2001 | Kobayashi et al. |
| 6,574,446 | B2 * | 6/2003 | Kitayama ................ F16D 3/44 399/111 |
| 8,554,109 | B2 | 10/2013 | Fukuzawa et al. |

FOREIGN PATENT DOCUMENTS

| | | |
|---|---|---|
| CN | 104249943 A | 12/2014 |
| JP | H10-025034 A | 1/1998 |
| JP | 2001-097587 A | 4/2001 |
| JP | 2012-008504 A | 1/2012 |

OTHER PUBLICATIONS

European Search Report dated Oct. 8, 2019, in related European Patent Application No. 19174814.4.

\* cited by examiner

SHEET FEEDING APPARATUS AND IMAGE FORMING APPARATUS

BACKGROUND OF THE INVENTION

Field of the Invention

The present invention relates to a sheet feeding apparatus and an image forming apparatus equipped with the same.

Description of the Related Art

Hitherto, Japanese Patent Application Laid-Open Publication No. H10-025034 discloses a sheet material feeding apparatus configured to separate sheets fed from a cassette one by one using a feed roller and a retard roller. The retard roller is supported rotatably on a retard shaft through a torque limiter, and the retard shaft is connected through a coupling to a drive shaft.

Pins are respectively press-fit to the drive shaft and the retard shaft at phases that differ 90 degrees, and the two pins are respectively passed through a long hole formed on a first end portion and a notch groove formed on a second end in an axial direction of the coupling. If the drive shaft rotates in a state where the coupling is inclined with respect to the drive shaft and the retard shaft, the influence of friction caused between the two pins and the long hole or the second end portion will change separating pressure applied from the retard roller to the feed roller. If the separating pressure is fluctuated greatly, the possibility of occurrence of delay and jamming of sheets and conveyance failure such as multiple feeding of sheets is increased.

SUMMARY OF THE INVENTION

According to a first aspect of the present invention, a sheet feeding apparatus includes a conveyance roller configured to convey sheets, a retard roller configured to contact the conveyance roller and separate sheets one by one, a drive input shaft driven by a driving source, a retard shaft configured to support the retard roller rotatably, a joint configured to transmit rotary drive force of the drive input shaft to the retard shaft, a first engaging portion provided on either one of the drive input shaft or the joint, a first engaged portion provided on the other of the drive input shaft or the joint, and configured to engage with the first engaging portion at a first engagement position in response to a rotation of the drive input shaft, a second engaging portion provided on either one of the retard shaft or the joint, and a second engaged portion provided on the other of the retard shaft or the joint, and configured to engage with the second engaging portion at a second engagement position in response to a rotation of the joint, wherein viewed in an axial direction of the joint, an angle formed by a first straight line and a second straight line is within a range of 80 degrees or greater and 100 degrees or smaller, the first straight line passing through the first engagement position and a center of rotation of the drive input shaft, the second straight line passing through the second engagement position and a center of rotation of the retard shaft.

According to a second aspect of the present invention, a sheet feeding apparatus includes a conveyance roller configured to convey sheets, a retard roller configured to contact the conveyance roller and separate sheets one by one, a drive input shaft driven by a driving source, a retard shaft configured to support the retard roller rotatably, a joint configured to transmit rotary drive force of the drive input shaft to the retard shaft, a first pin provided on either one of the drive input shaft or the joint, a first groove portion provided on the other of the drive input shaft or the joint, and configured to engage with the first pin at a first engagement position in response to a rotation of the drive input shaft, a second pin provided on either one of the retard shaft or the joint; and a second groove portion provided on the other of the retard shaft or the joint, and configured to engage with the second pin at a second engagement position in response to a rotation of the joint, wherein in a state where the first pin and the second pin are respectively engaged with the first groove portion and the second groove portion, the first pin and the second pin are arranged so that an angle formed by an axis of the first pin and an axis of the second pin is within a range of 50 degrees or greater and 70 degrees or smaller when viewed in an axial direction of the joint.

Further features of the present invention will become apparent from the following description of exemplary embodiments with reference to the attached drawings.

DESCRIPTION OF THE EMBODIMENTS

Overall Configuration

Figure 1:
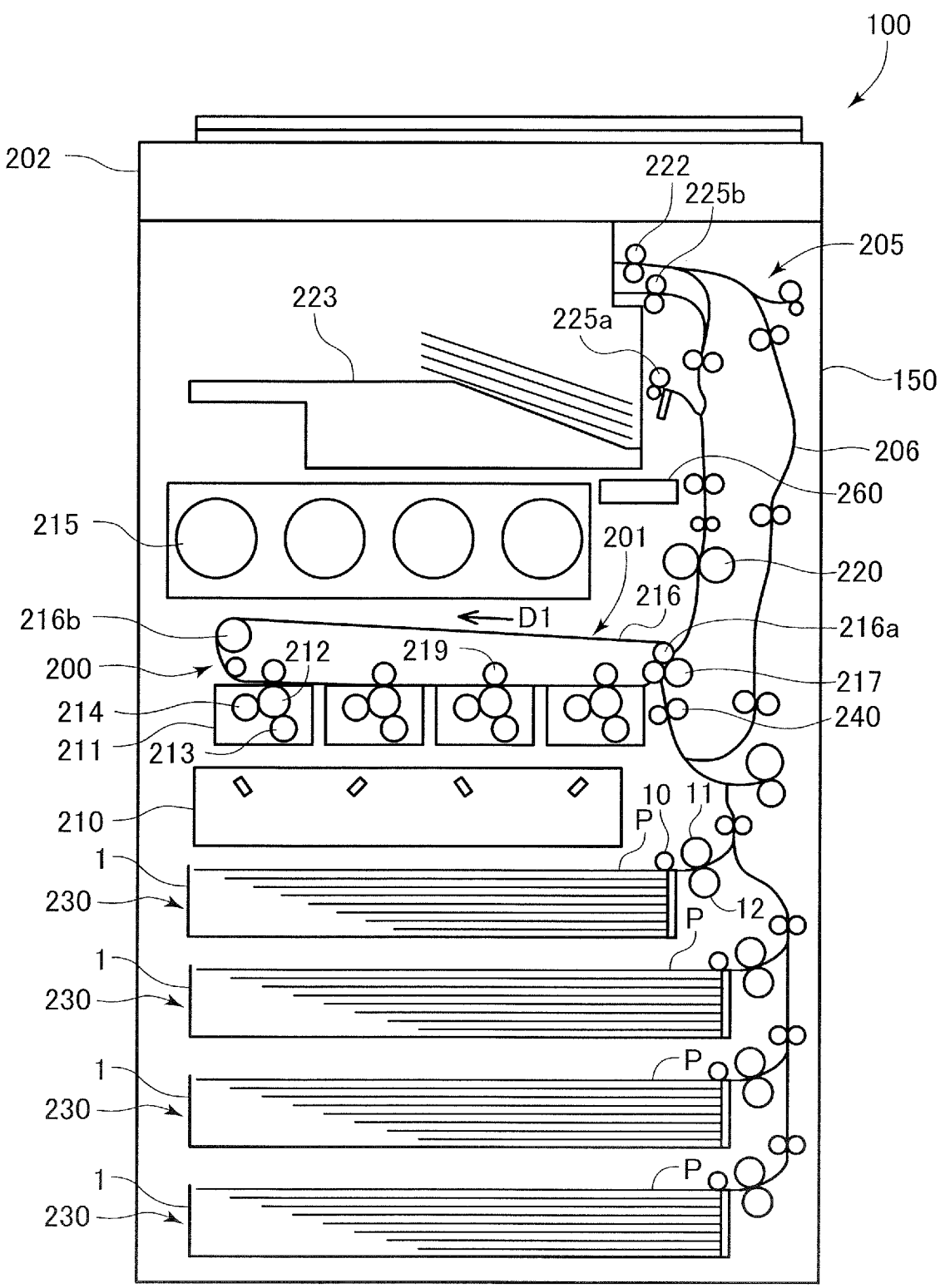
FIG. 1 is a schematic drawing illustrating a configuration of an image forming apparatus according to an embodiment of the present invention.

Now, a sheet feeding apparatus and an image forming apparatus according to the present invention will be described with reference to the drawings. First, a printer 100 serving as an image forming apparatus according to the present embodiment will be described. The printer 100 is a full-color laser beam printer adopting an electrophotographic system. As illustrated as an example in FIG. 1, the printer 100 includes an image reading apparatus 202 for reading image data from documents arranged above an apparatus body 150 at a position in which a loading surface of the document is arranged approximately horizontally. A discharge space to which sheets P are discharged is formed between the image reading apparatus 202 and the apparatus body 150, and a sheet discharge tray 223 is arranged in the discharge space. Further, the printer 100 includes, in an interior of the apparatus body 150, an image forming unit 200 for forming an image on the sheet P, a sheet feeding portion 230 for feeding the sheet P toward the image forming unit 200, and a control unit 260 for controlling image forming operation, sheet feeding operation and so on.

The image forming unit 200 constitutes an image forming unit adopting a so-called four-drum full-color system, including a laser scanner 210, four process cartridges 211 and an intermediate transfer unit 201. The process cartridges 211 respectively form toner images of respective colors of yellow (Y), magenta (M), cyan (C) and black (K). The respective process cartridges 211 include a photosensitive drum 212, a charging unit 213, a developing unit 214, a cleaner not shown, and so on. Toner cartridges 215 storing toner of respective colors is attached detachably to the apparatus body 150 at a position above the image forming unit 200.

The intermediate transfer unit 201 is configured by having an intermediate transfer belt 216 serving as an intermediate transfer body wound around a drive roller 216*a* and a tension roller 216*b*, and for example, it is arranged above the four process cartridges 211. The intermediate transfer belt 216 is arranged to contact the photosensitive drums 212 of the respective process cartridges 211, and driven to rotate in a direction of arrow D1, for example, by the drive roller 216*a*. The intermediate transfer unit 201 includes a primary transfer roller 219 that comes into contact with an inner circumferential surface of the intermediate transfer belt 216 at a position opposed to the respective photosensitive drums 212, and a primary transfer portion serving as a nip portion is formed between the intermediate transfer belt 216 and the photosensitive drum 212. The image forming unit 200 includes a secondary transfer roller 217 that comes into contact with the outer peripheral surface of the intermediate transfer belt 216 at a position opposed to the drive roller 216*a*. A secondary transfer portion for transferring toner image borne on the intermediate transfer belt 216 to the sheet P is formed as a nip portion between the secondary transfer roller 217 and the intermediate transfer belt 216.

The sheet feeding portion 230 includes four sets of cassettes 1, feed rollers 10, conveyance rollers 11 and retard rollers 12. Each cassette 1 is arranged in a manner capable of being inserted to and removed from the apparatus body 150, and stores the sheets Pin a stacked manner.

In a state where the printer 100 receives a command to start the image forming operation, the photosensitive drum 212 rotates and the surface of the photosensitive drum 212 is charged uniformly by the charging unit 213. Then, the laser scanner 210 modulates and outputs laser beams based on image data entered from an input interface or an external computer. The laser scanner 210 outputs laser beams and scans the surface of the respective photosensitive drums 212, by which electrostatic latent images based on image data are formed on the surfaces of the respective photosensitive drums 212. That is, yellow, magenta, cyan and black electrostatic latent images are sequentially formed on the surfaces of the photosensitive drums 212 of the respective process cartridges 211. The yellow, magenta, cyan and black electrostatic latent images being formed are visualized by toner supplied from the developing units 214, by which yellow, magenta, cyan and black toner images are developed. The yellow, magenta, cyan and black toner images are sequentially transferred to the intermediate transfer belt 216 and superposed on the other toner images. Thereby, a full-color toner image is formed on the intermediate transfer belt 216.

Meanwhile, in the printer 100, simultaneously as the image forming operation, the sheet feeding portion 230 feeds sheets P toward the image forming unit 200. In the sheet feeding portion 230, at first, for example, the sheet P stacked in the cassette 1 is sent out by the feed roller 10. The sheet P having been sent out by the feed roller 10 is separated one by one by the conveyance roller 11 and the retard roller 12 and conveyed to a registration roller pair 240. The sheet P conveyed to the registration roller pair 240 is subjected to skew correction by the registration roller pair 240. Thereafter, the sheet P is conveyed to the secondary transfer portion of the image forming unit 200 at a matched timing with the toner image borne on the photosensitive drum 212. The toner image bone on the photosensitive drum 212 is transferred collectively to the sheet P by a secondary transfer bias applied to the secondary transfer roller 217. After transfer of the toner image, the toner remaining on the photosensitive drum 212 is collected by a cleaner. The sheet P on which the toner image has been transferred is heated and pressed by a fixing unit 220, by which toner image transferred to the sheet P is fixed. The sheet P to which the toner image has been fixed is discharged to the sheet discharge tray 223 by sheet discharge roller pairs 225*a* or 225*b*.

In order to form images on both sides of the sheet P, after completing fixing of image to the surface of the sheet P, the sheet is subjected to switch-back by a reverse conveyance roller pair 222 capable of rotating in normal and reverse directions disposed in a reverse conveyance portion 205. Then, the sheet P is re-conveyed to the image forming unit 200 through a re-conveyance path 206, where image is formed on a rear side of the sheet P.

Sheet Feeding Apparatus

Figure 2:
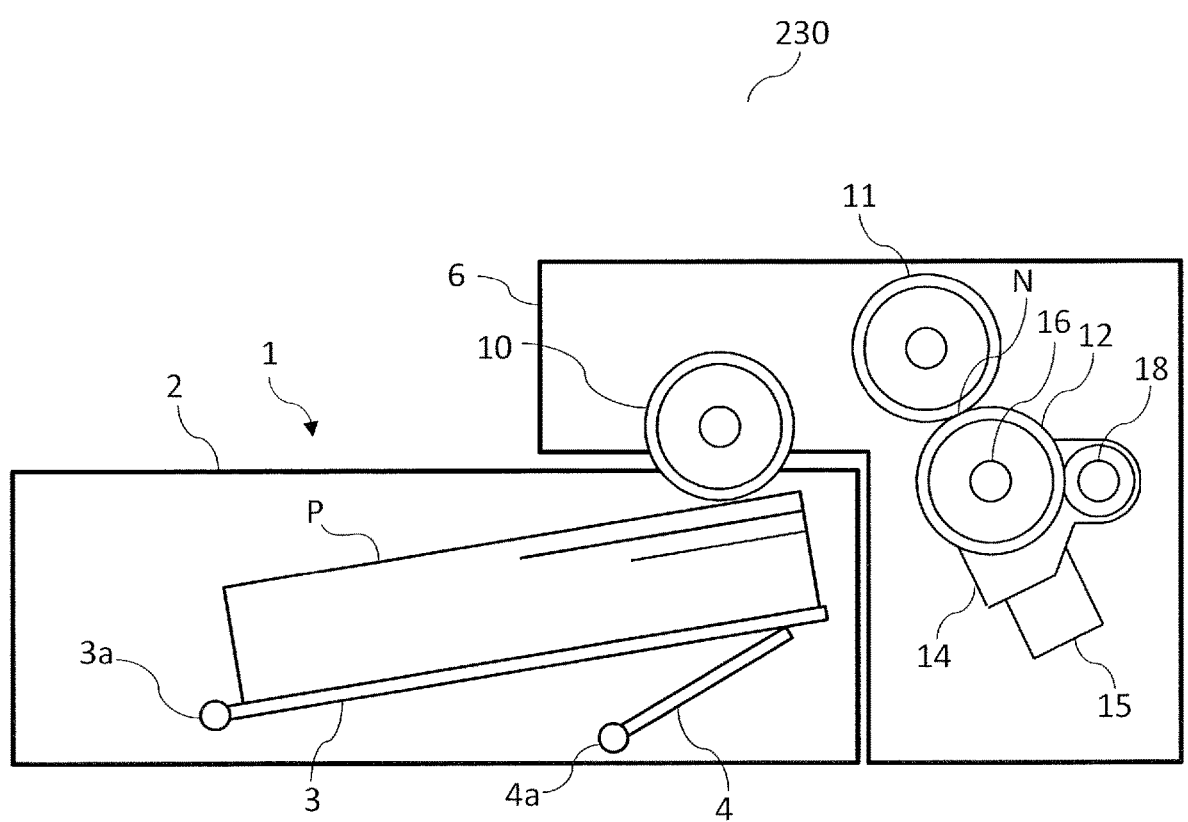
FIG. 2 is a schematic drawing illustrating a configuration of a sheet feeding apparatus according to the embodiment of the present invention.

Next, the sheet feeding portion 230 serving as a sheet feeding apparatus will be described with reference to FIGS. 2 through 5. As described, the sheet feeding portion 230 includes the feed roller 10, the conveyance roller 11 and the retard roller 12. As illustrated in FIG. 2, the feed roller 10, the conveyance roller 11 and the retard roller 12 are respectively rotatably supported on a sheet feed frame 6 fixed to the apparatus body 150 (refer to FIG. 1). Further, a swing shaft 18 that supports the retard roller 12 pivotably in up and down directions is attached to the sheet feed frame 6. A retard roller holder 14 is attached via the swing shaft 18 to the sheet feed frame 6 in a swingable manner around the swing shaft 18. Further, the retard roller holder 14 retains a retard shaft 16 that supports the retard roller 12 rotatably. A spring 15 that urges the retard roller holder 14 upward, that is, toward the conveyance roller 11, is arranged below the retard roller holder 14.

Since the retard roller holder 14 is arranged pivotably in up and down directions and urged upward, the retard roller 12 is capable of coming into contact with the conveyance roller 11 in a state urged toward the conveyance roller 11. That is, the retard roller 12 is in pressure contact with the conveyance roller 11 by the elastic force of the spring 15. Since the retard roller 12 is in pressure contact with the conveyance roller 11, a separation nip portion N that separates the sheets P is formed between the retard roller 12 and the conveyance roller 11.

Meanwhile, the cassette 1 is capable of being inserted to and removed from the apparatus body 150. Inside a cassette body 2 is provided a support plate 3 capable of supporting sheets P in a stacked manner, a lifting plate 4 capable of supporting the support plate 3 from below and which is pivotable in up and down directions, and pivot shafts 3a and 4a that respectively pivot the support plate 3 and the lifting plate 4 in up and down directions. The support plate 3 is attached to the pivot shaft 3a pivotably around the pivot shaft 3a. Further, the lifting plate 4 is arranged below the support plate 3 pivotably around the pivot shaft 4a in up and down directions. The lifting plate 4 pivots by receiving supply of driving force from a lifter motor not shown and lifts the support plate 3.

In a state where the sheet feeding portion 230 feeds the sheet P, the lifting plate 4 pivots in the upper direction around the pivot shaft 4a, by which the support plate 3 is lifted to a position capable of feeding the uppermost sheet P placed on the support plate 3. The sheet P is fed by the feed roller 10, and the fed sheet P is separated one by one by the separation nip portion N.

Drive Transmission Configuration of Retard Roller

Figure 3:
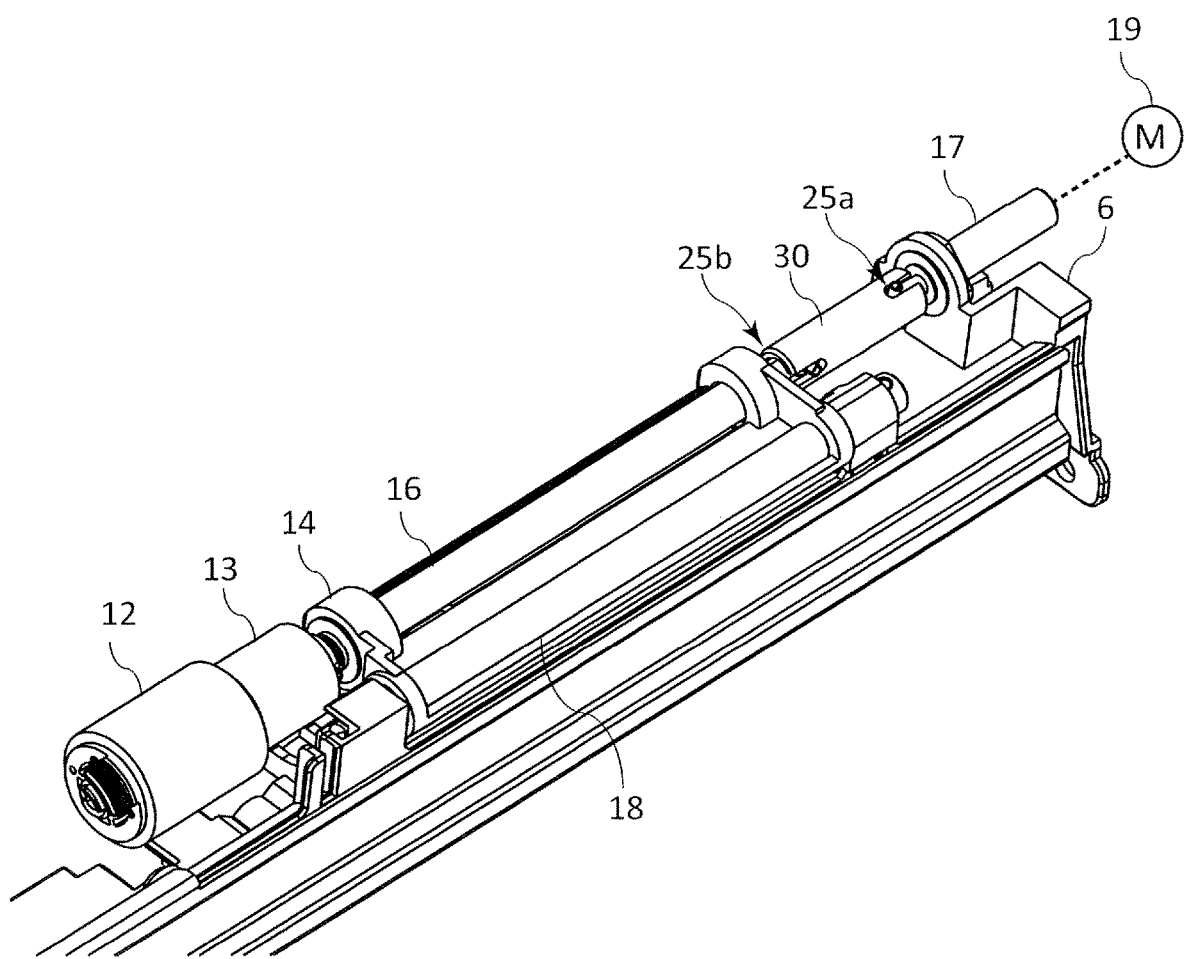
FIG. 3 is a perspective view illustrating a configuration of a retard roller, a retard shaft, a joint member and a drive shaft in a state where the drive shaft and the retard shaft are not deviated.
Figure 4:
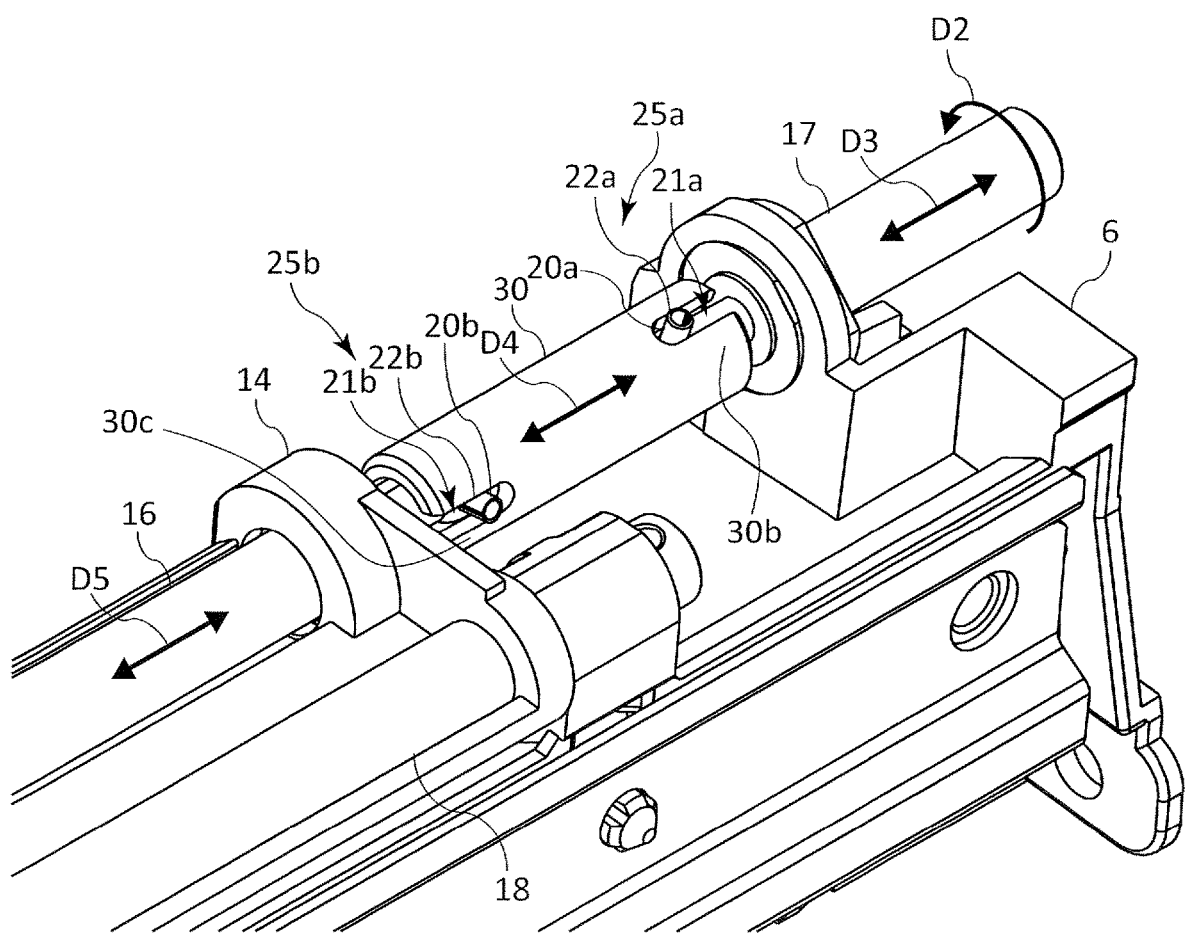
FIG. 4 is a perspective view illustrating a connection portion and a joint member in enlarged view.

Next, drive transmission configuration of the retard roller 12 will be described with reference to FIGS. 3 and 4. As illustrated in FIG. 3, a drive shaft 17 serving as a drive input shaft is rotatably supported on the sheet feed frame 6 by driving force transmitted from a motor 19 serving as a driving source. Further, the swing shaft 18 is attached to the sheet feed frame 6, as described above. The drive shaft 17 and the retard shaft 16 are connected by a joint member 30 serving as a joint that transmits rotary drive force of the drive shaft 17 to the retard shaft 16. The drive shaft 17 and the joint member 30 are connected by a first connection portion 25a that does not allow relative rotation of the drive shaft 17 and the joint member 30. Further, the joint member 30 and the retard shaft 16 are connected by a second connection portion 25b that does not allow relative rotation of the retard shaft 16 and the joint member 30. The retard roller 12 is attached via a torque limiter 13 to an end portion in an axial direction of the retard shaft 16 on a side where the joint member 30 is not connected. In other words, the torque limiter 13 is interposed between the retard roller 12 and the retard shaft 16. The motor 19 rotates only in one direction, and the drive shaft 17, the joint member 30 and the retard shaft 16 rotate only in one direction by driving force of the motor 19.

The drive shaft 17, the joint member 30 and the retard shaft 16 will be described in further detail with reference to FIG. 4. The drive shaft 17 is formed to rotate in the direction of arrow D2 by being driven by the motor 19 (refer to FIG. 3) and to extend in the direction of arrow D3. In other words, the direction of arrow D3 indicates an axial direction, hereinafter referred to as "drive shaft direction", of the drive shaft 17. Further, the joint member 30 connected to the drive shaft 17 via the first connection portion 25a extends in the direction of arrow D4, and it is formed in a cylindrical shape. That is, arrow D4 indicates an axial direction, hereinafter referred to "joint shaft direction", of the joint member 30. Further, the retard shaft 16 connected to the joint member 30 via the second connection portion 25b is formed to extend in a direction of arrow D5. That is, the direction of arrow D5 indicates a retard shaft direction in which the retard shaft 16 extends. The retard shaft direction is parallel to the drive shaft direction.

Figure 5:
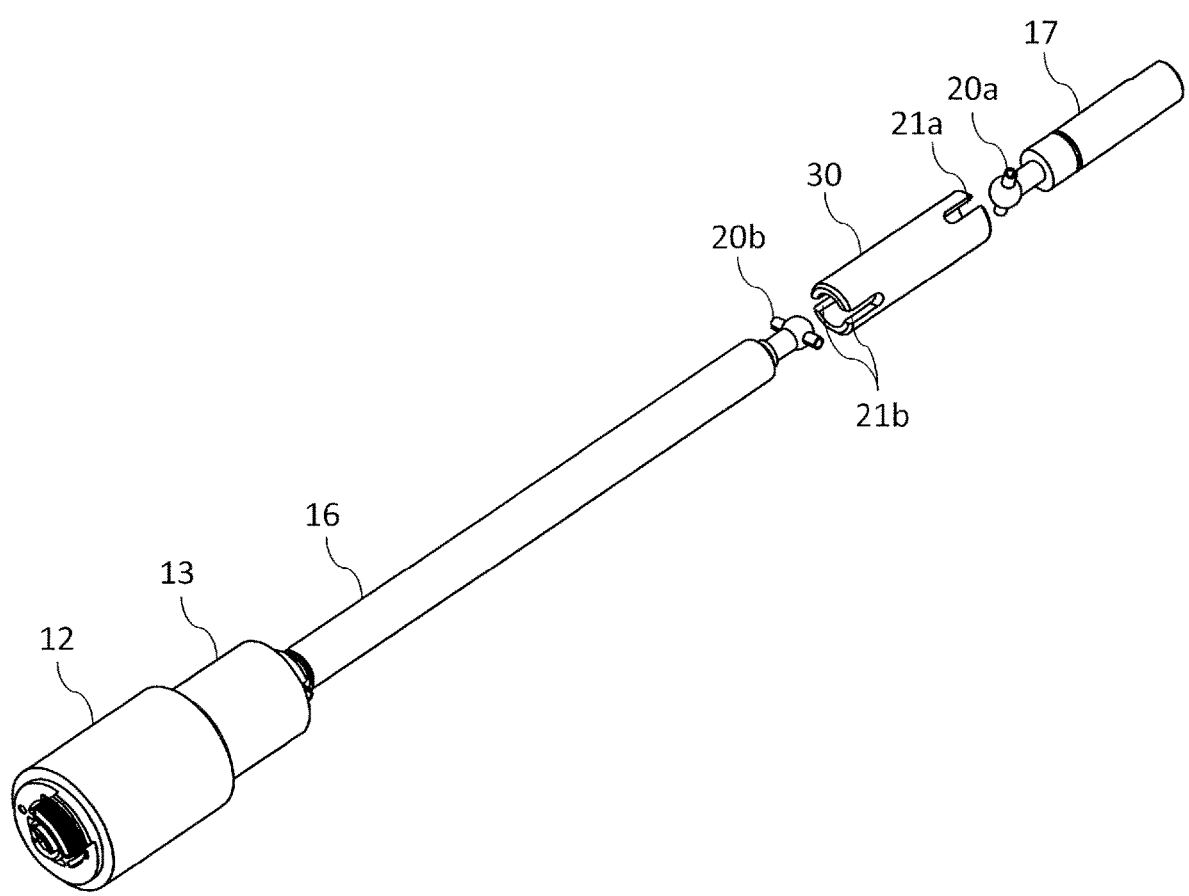
FIG. 5 is an exploded view of the retard roller and the retard shaft.

The first connection portion 25a includes a first pin 20a having a cylindrical shape disposed on the drive shaft 17 and a pair of first groove portions 21a that are formed on the joint member 30 and are engaged with the first pin 20a in response to the rotation of the drive shaft 17. The pair of first groove portions 21a is formed at positions having a 180-degree phase difference in the direction of rotation of the joint member 30. The first pin 20a serving as a first engaging portion is arranged at an end portion of the drive shaft 17, as illustrated in FIG. 5, and has a cylindrical shape. Further, the first pin 20a is extended in a direction orthogonal to the drive shaft direction. The first pin is not necessarily extended in the direction orthogonal to the drive shaft direction, and it should merely be extended in a direction intersecting the joint shaft direction. The first groove portions 21a serving as a first engaged portion are arranged at a first end portion 30b in a joint shaft direction of the joint member 30, and they extend in a joint shaft direction. The first pin 20a and the first groove portions 21a are engaged at a first contact portion 22a serving as a first engagement position.

The second connection portion 25b includes a second pin 20b having a cylindrical shape disposed on the retard shaft 16 and a pair of second groove portions 21b that are formed on the joint member 30 and are engaged with the second pin 20b in response to the rotation of the joint member 30. The pair of second groove portions 21b is formed at positions having a 180-degree phase difference in the direction of rotation of the joint member 30. The second pin 20b serving as a second engaging portion is arranged at an end portion of the retard shaft 16, as illustrated in FIG. 5, and has a cylindrical shape. Further, the second pin 20b is extended in a direction orthogonal to the retard shaft direction. The second pin 20b is not necessarily extended in a direction orthogonal to the retard shaft direction, and it should merely be extended in a direction intersecting the joint shaft direction. The second groove portions 21b serving as a second engaged portion are arranged at a second end portion 30c in a joint shaft direction of the joint member 30, and they extend in a joint shaft direction. The second pin 20b and the second groove portions 21b are engaged at a second contact portion 22b serving as a second engagement position.

Fluctuation of Retard Pressure

Figure 6:
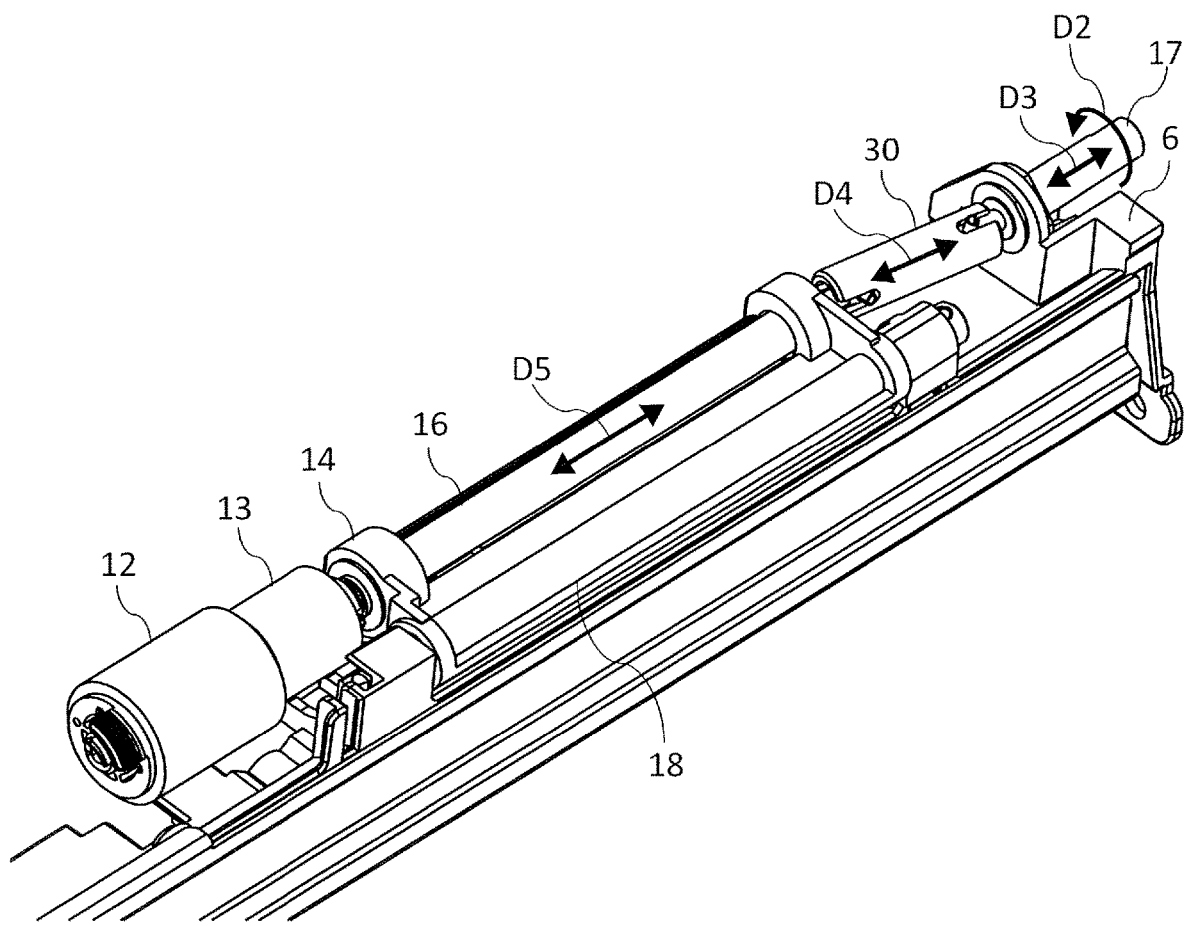
FIG. 6 is a perspective view illustrating a configuration of the retard roller, the retard shaft, the joint member and the drive shaft in a state where the drive shaft and the retard shaft are not deviated.

Regarding the retard roller 12, the retard shaft 16 may be deviated with respect to the drive shaft 17 due to influences of dimension accuracy of parts, deformation and wear of rubber roller and so on. That is, as illustrated in FIG. 6, the joint member 30 may be inclined with respect to the drive shaft 17 and the retard shaft 16, so that the drive shaft direction indicated by arrow D3 and the joint shaft direction indicated by arrow D4 mutually intersect. For example, as illustrated in FIG. 6, if the retard shaft 16 is deviated toward the downstream side in a sheet conveyance direction, the joint member 30 rotates in an inclined manner with respect to the drive shaft 17 and the retard shaft 16 and transmits driving force from the drive shaft 17 to the retard shaft 16. That is, the retard shaft 16 rotates in an eccentric manner with respect to the drive shaft 17. In that state, the force attempting to rotate the drive shaft 17 and the retard shaft 16 while the joint member 30 maintains an inclined state is created in both the first connection portion 25a and the second connection portion 25b. As a result, fluctuation of pressure contact force, hereinafter referred to as "retard pressure", in which the retard roller 12 presses the conveyance roller 11 is generated. In the retard roller 12 in which the retard shaft 16 is deviated toward the downstream side in the sheet conveyance direction as illustrated in FIG. 6, the retard pressure is reduced.

Figure 7:
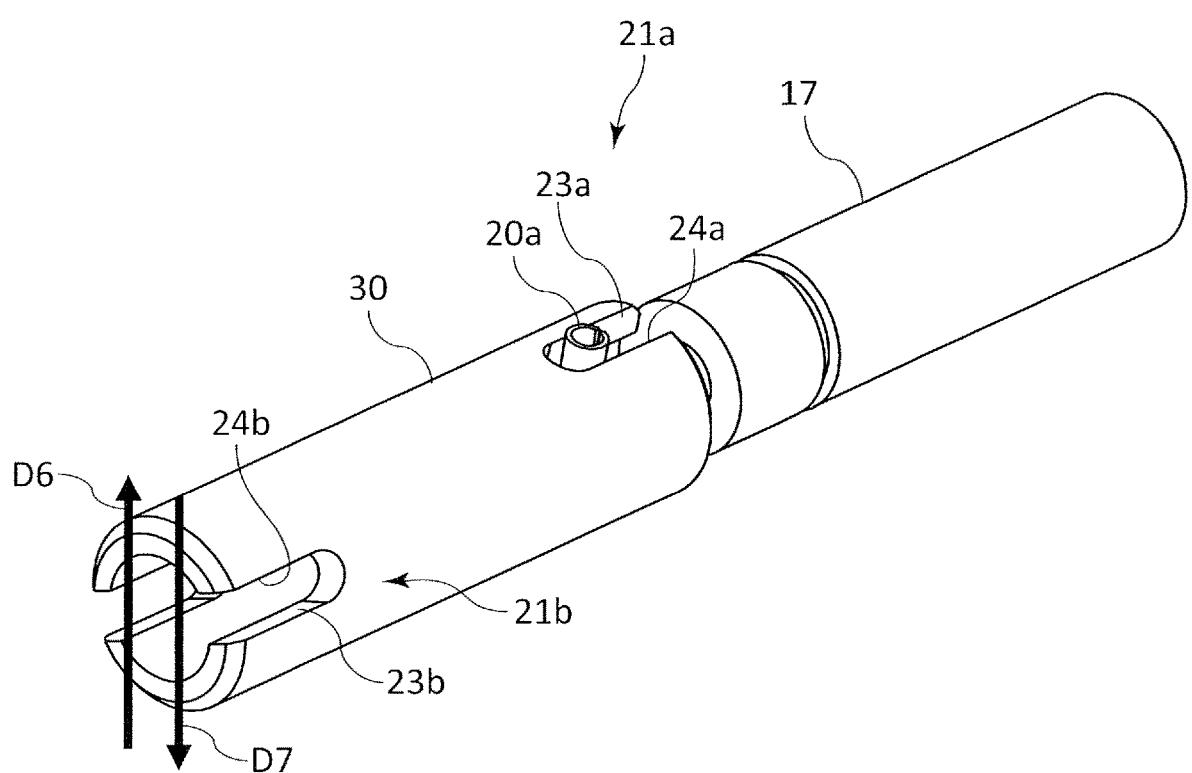
FIG. 7 is a perspective view illustrating a positional relationship of the first pin and the joint member in a state where a swing resistance of a regard roller holder becomes maximum.

In a state where the joint member 30 rotates in a direction of arrow D2 illustrated in FIG. 6 while the joint member 30 is inclined with respect to the drive shaft 17 and the retard shaft 16, the first pin 20a and the first groove portions 21a and the second pin 20b (refer to FIG. 4) and the second groove portions 21b (refer to FIG. 4) are relatively moved in sliding motion. The first groove portions 21a include, as illustrated in FIG. 7, a first surface 23a and a second side 24a that extend in the joint shaft direction and are mutually opposed to one another interposing the first pin 20a. The first surface 23a is positioned downstream of the second side 24a in the direction of rotation, i.e., arrow D2 direction, of the joint member 30. Similarly, the second groove portions 21b includes a third surface 23b and a fourth surface 24b that extend in the joint shaft direction and are mutually opposed to one another interposing the second pin 20b. The third surface 23b is positioned upstream of the fourth surface 24b in the direction of rotation, i.e., arrow D2 direction, of the joint member 30. If the joint member 30 rotates in a state inclined with respect to the drive shaft 17 and the retard shaft 16, the first pin 20a moves in sliding motion in contact with either the first surface 23a or the second side 24a depending on the direction of rotation of the drive shaft 17. Similar to the first pin 20a, the second pin 20b also moves in sliding motion in contact with either the first surface 23a or the second side 24a depending on the direction of rotation of the drive shaft 17. During such relative sliding motion, frictional force generated at the first connection portion 25a and the second connection portion 25b changes periodically according to the phase of the direction of rotation of the first pin 20a and the second pin 20b. The frictional force changes depending on the direction in which the shafts of the first pin 20a and the second pin 20b are arranged with respect to the direction in which the retard pressure operates.

Figure 8:
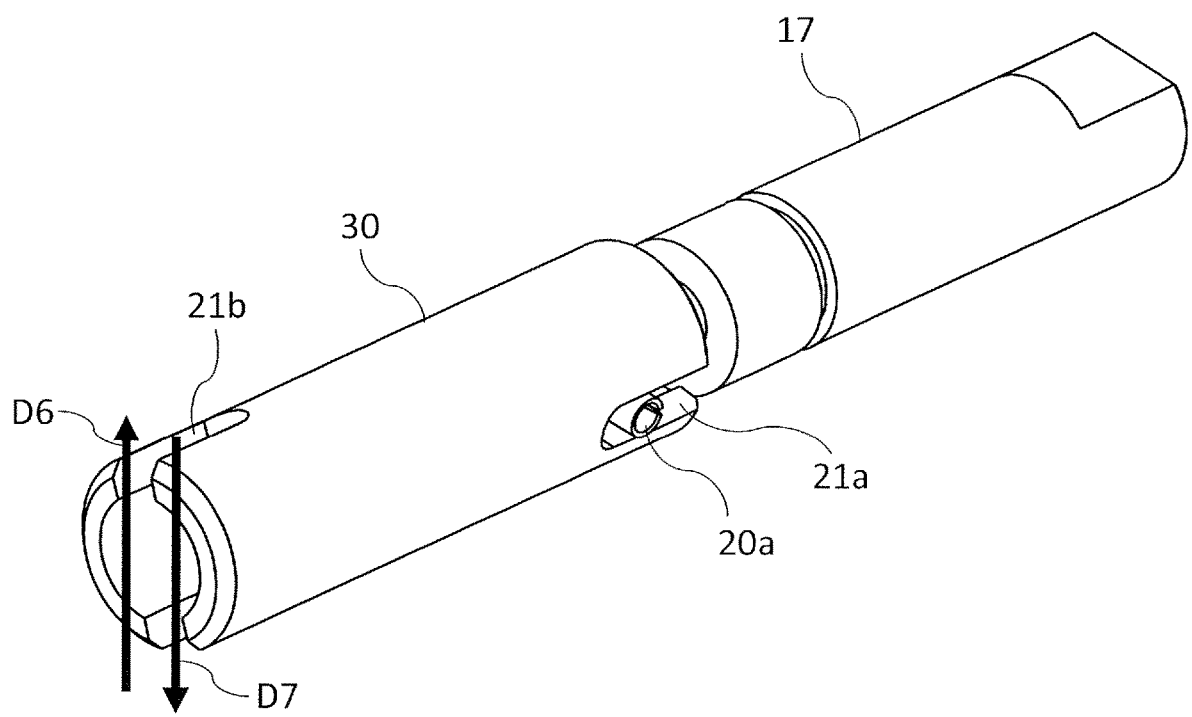
FIG. 8 is a perspective view illustrating a positional relationship of the first pin and the joint member in a state where the swing resistance of the retard roller holder becomes minimum.

Direction of arrow D6 and direction of arrow D7 illustrated in FIGS. 7 and 8 indicate a swing direction of the retard roller 12. For example, the frictional force in the swing direction generated at the first connection portion 25a becomes relatively great in a state where the axial direction of the first pin 20a is arranged in the swing direction of the retard roller 12, as illustrated in FIG. 7. Therefore, the amount of change of retard pressure becomes great by the frictional force created at the first connection portion 25a. Meanwhile, the frictional force in the swing direction generated at the first connection portion 25a becomes relatively small in a state where the axial direction of the first pin 20a is arranged orthogonal to the swing direction of the retard roller 12, as illustrated in FIG. 8. Therefore, the amount of change of retard pressure becomes small by the frictional force at the first connection portion 25a. Such periodic change of frictional force similarly occurs at the second connection portion 25b, and in response to the rotation of the drive shaft 17, the joint member 30 and the retard shaft 16, the retard pressure periodically changes. As described, if retard pressure is not stable, the probability of occurrence of conveyance failure such as delay and jamming of sheets or multiple feeding will be increased.

Suppression of Fluctuation of Retard Pressure

Next, suppression of fluctuation of retard pressure at the retard roller 12 will be described. As described, in a state where the drive shaft 17 (refer to FIG. 4) rotates, the retard pressure fluctuates by the influence of frictional force that occurs both at the first connection portion 25a and the second connection portion 25b. Therefore, the final fluctuation of retard pressure appears as a synthetic wave in which a waveform indicating the amount of fluctuation of retard pressured caused by the frictional force at the first connection portion 25a and a waveform indicating the amount of fluctuation of retard pressure caused by the frictional force at the second connection portion 25b are superposed. An amplitude of the synthetic wave is determined by a positional relationship of the first pin 20a and the second pin 20b in the direction of rotation of the joint member 30.

Figure 9:
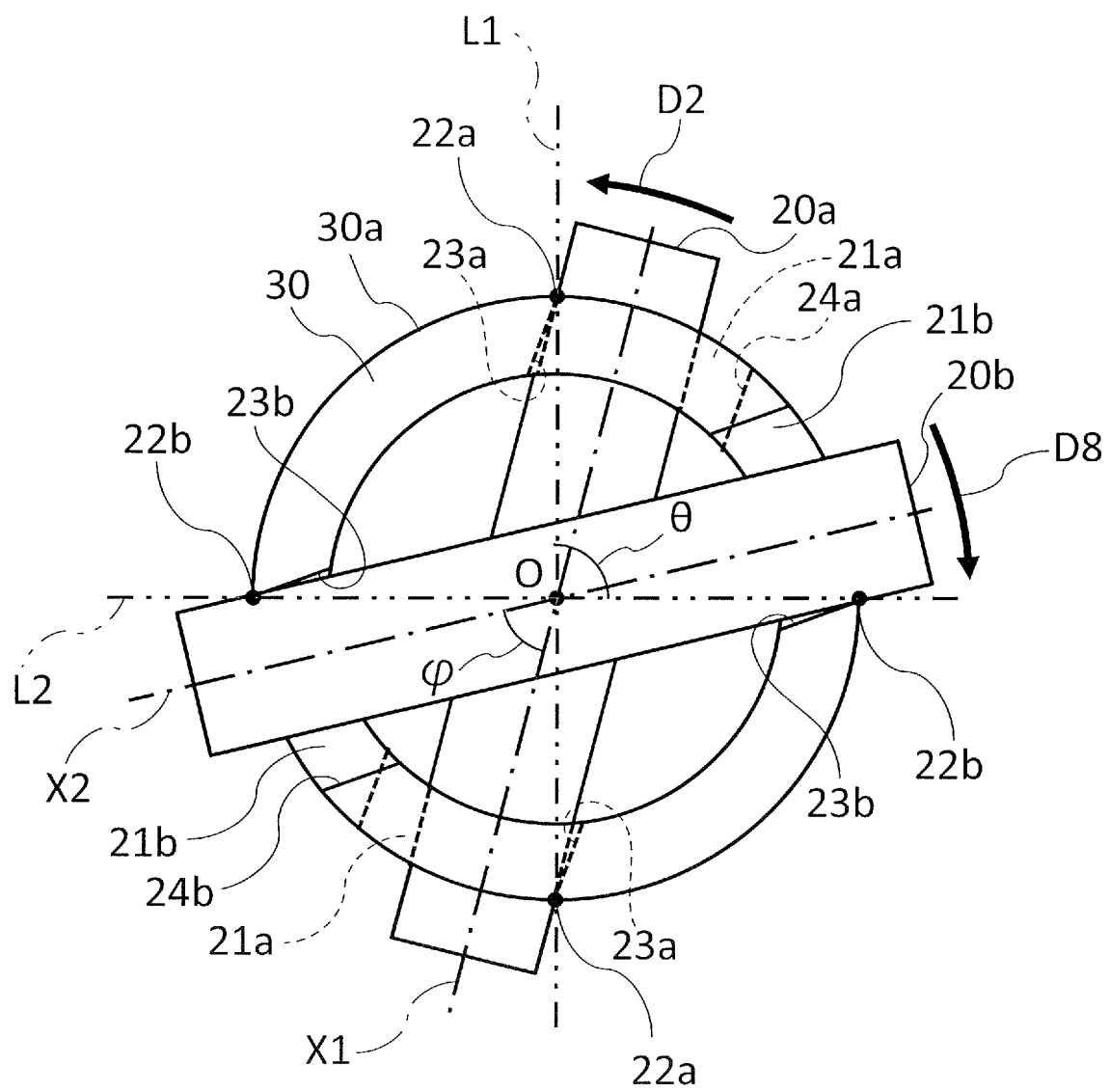
FIG. 9 is an explanatory view schematically illustrating a positional relationship of the first pin and the second pin viewing a first connection portion and a second connection portion from a second axial direction.

FIG. 9 schematically illustrates the positional relationship of the first pin 20a and the second pin 20b viewed in a second axial direction in which the joint member 30 extends. As illustrated in FIG. 9, in a state where the drive shaft 17 (refer to FIG. 6) rotates in the direction of arrow D2, driving force from the motor 19 (refer to FIG. 3) is transmitted to the joint member 30 and further transmitted to the retard shaft 16. In a state where the drive shaft 17 rotates in the direction of arrow D2, the first pin 20a contacts the downstream side surface of the first groove portions 21a in the direction of arrow D2 between the first surface 23a and the second side 24a, that is, contacts the first surface 23a at the first contact portion 22a. The first contact portion 22a is positioned at a boundary part between the first surface 23a and an outer peripheral surface 30a of the joint member 30.

Meanwhile, the retard roller 12 constantly receives corotating force in the sheet conveyance direction while the driving force is entered from the drive shaft 17. Therefore, the retard shaft 16 is driven by receiving resistance force in a direction resisting against the direction of the driving force being transmitted, that is, resistance force in a direction of arrow D8 that is an opposite direction of rotation as the direction of rotation of the arrow D2. That is, the second pin 20b contacts the downstream side surface of the second groove portions 21b in the direction of arrow D8 between the third surface 23b and the fourth surface 24b, that is, contacts the second contact portion 22b of the third surface 23b. The second contact portion 22b is positioned at a boundary part between the third surface 23b and the outer peripheral surface 30a of the joint member 30.

If an angle formed by a first straight line L1 that passes the first contact portion 22a and a center of rotation O and a second straight line L2 that passes the second contact portion 22b and the center of rotation O is defined as angle θ, the angle θ can be 0 degrees or greater and smaller than 180 degrees. Depending on the size of the angle θ (refer to FIG. 9), a fluctuation width in which the retard pressure fluctuates, that is, the amplitude of the synthetic wave, changes.

Figure 10:
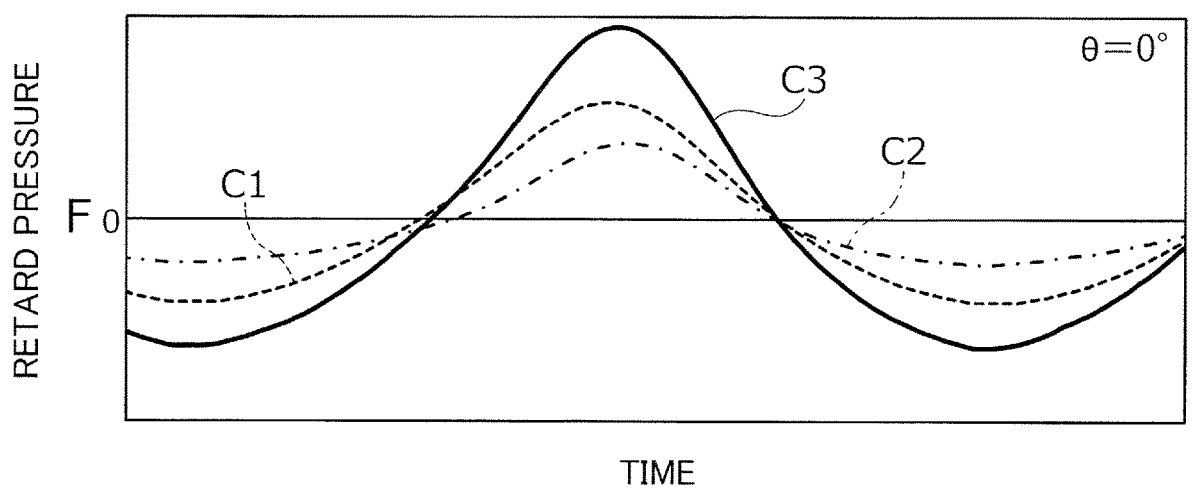
FIG. 10 is a graph illustrating a change of retard pressure with respect to time in a case where θ=0°.
Figure 11:
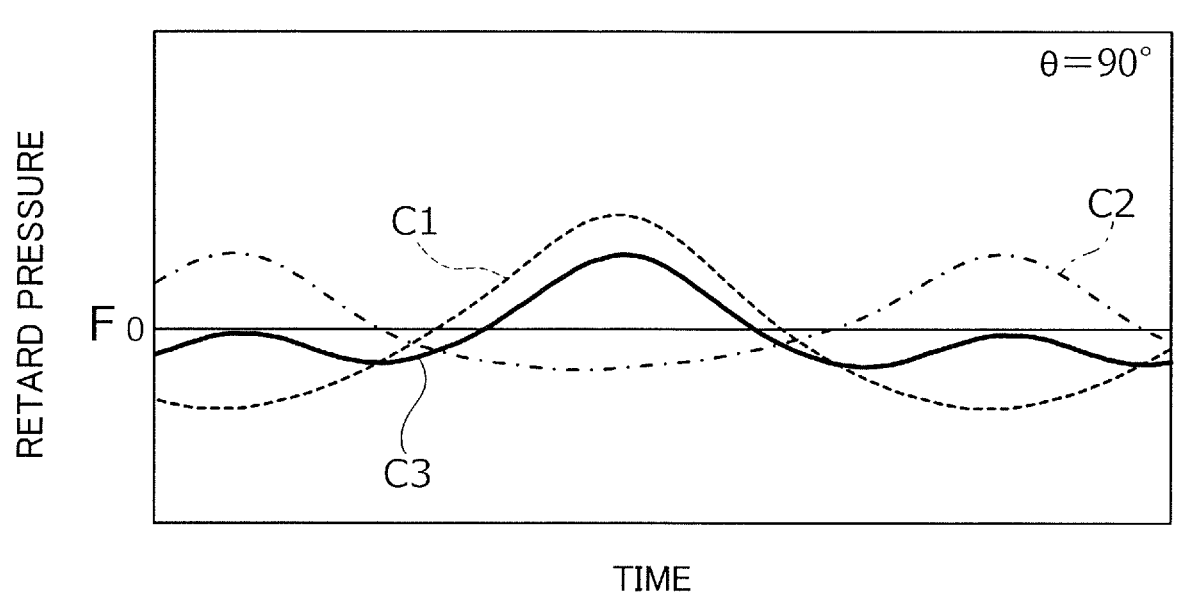
FIG. 11 is a graph illustrating a change of retard pressure with respect to time in a case where θ=90°.

Next, the change of synthetic waves according to angle θ will be described. In FIGS. 10 and 11, wave C3, which is a synthetic wave of wave C1 indicating the fluctuation of retard pressure generated at the first connection portion 25a and wave C2 indicating the fluctuation of retard pressure generated at the second connection portion 25b, indicates the final fluctuation of retard pressure. As illustrated in FIG. 10, if angle θ is 0 degrees, wave C1 and wave C2 are in phase, that is, wave C1 and wave C2 become maximum and minimum at the same time. That is, in the case of θ=0° illustrated in FIG. 10, wave C3 is a result of waves C1 and C2 intensifying each other. Wave C3 takes a greater maximum value at time when waves C1 and C2 become maximum and takes a smaller minimum value at time when waves C1 and C2 become minimum. As a result, the retard pressure indicated by wave C3 has a large deviation quantity from target value $F_0$ of retard pressure at times when waves C1 and C2 become minimum and maximum.

In contrast, the retard roller 12 of the printer 100 (refer to FIG. 1) is designed so that the angle θ is approximately 90 degrees. In the case of θ=90°, as illustrated in FIG. 11, waves C1 and C2 are of opposite phase, that is, wave C2 becomes minimum at time when wave C1 becomes maximum, and wave C2 becomes maximum at time when wave C1 becomes minimum. In other words, wave C3 is a result of wave C1 and wave C2 weakening each other. In wave C3, wave C2 becomes minimum when wave C1 becomes maximum and becomes maximum when wave C1 becomes minimum. As a result, the retard pressure indicated by wave C3 approximates the target value $F_0$ as a whole, and deviation quantity from the target value $F_0$ is suppressed to a minimum.

Figure 12:
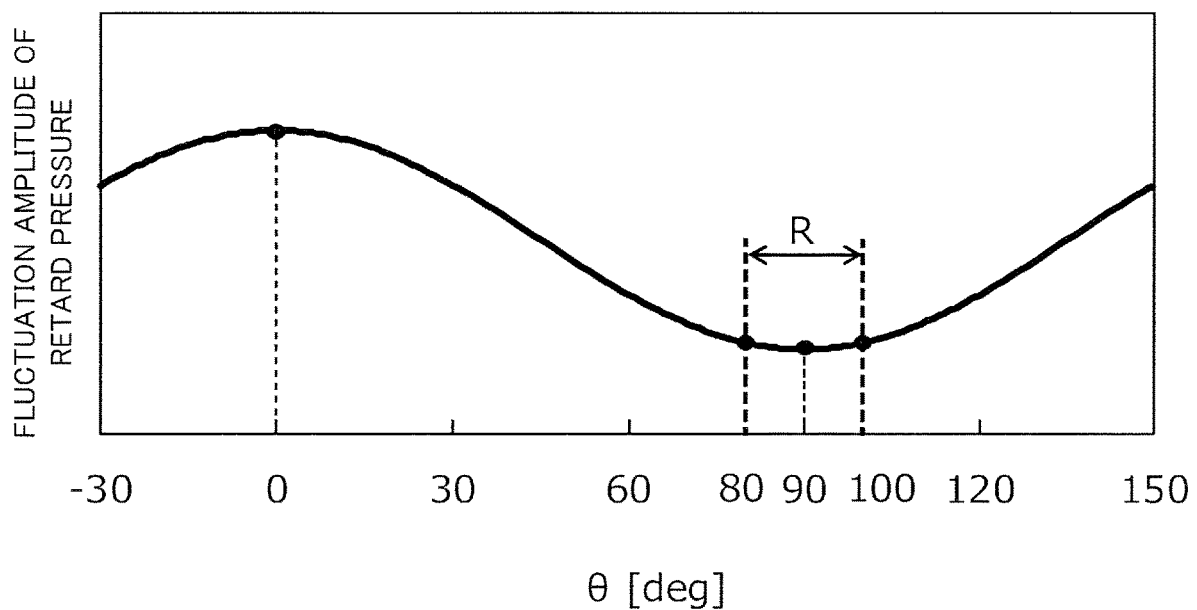
FIG. 12 is a graph illustrating a relationship between angle θ formed by first straight line and second straight line and fluctuation amplitude of retard pressure.

As described, the width of fluctuation in which the retard pressure fluctuates (hereinafter referred to as "fluctuation amplitude") varies according to the value of angle $\theta$ (refer to FIG. 9). FIG. 12 is a graph illustrating the relationship between angle $\theta$ and fluctuation amplitude of retard pressure. In further detail with reference to FIG. 12, the fluctuation amplitude of retard pressure is a periodic function of angle $\theta$ where one cycle is 180 degrees. In the range where $\theta$ is between −30 to 150 degrees illustrated in FIG. 12, the fluctuation amplitude becomes maximum when $\theta=0°$ and the fluctuation amplitude becomes minimum when $\theta=90°$. Further, range R illustrated in FIG. 12 indicates a range of angle $\theta$ where the fluctuation amplitude value is 5% or smaller with respect to the fluctuation amplitude value at $\theta=90°$ where fluctuation amplitude becomes minimum. In other words, if angle $\theta$ is within the range of 80 degrees or greater and 100 degrees or smaller, i.e., $80°\le\theta\le100°$, the fluctuation amplitude can be suppressed to 5% or smaller with respect to the minimum value.

If the fluctuation amplitude exceeds 5% of the minimum value, the rate of conveyance failure of sheets increases, whereas if the fluctuation amplitude falls below 5% of the minimum value, the rate of conveyance failure of sheets can be suppressed. Therefore, according to the present embodiment, the first pin 20a, the second pin 20b, the first groove portions 21a and the second groove portions 21b are arranged so that angle $\theta$ is approximately 90 degrees, that is, angle $\theta=90°\pm10°$. Such arrangement of the first pin 20a, the second pin 20b, the first groove portions 21a and the second groove portions 21b enables to sufficiently suppress fluctuation of the retard pressure and reduce conveyance failure of sheets. It is effective to approximate angle $\theta$ to 90 degrees as much as possible to maximize the effect of suppressing fluctuation of retard pressure.

The effect of suppressing fluctuation of retard pressure has been described based on angle $\theta$ formed by the first straight line L1 (refer to FIG. 9) and the second straight line L2, but the same concept can be described based on angle $\phi$ formed by axis X1 and axis X2 illustrated in FIG. 9. Based on angle $\phi$, the fluctuation amplitude can be suppressed to 5% or smaller with respect to the minimum value if the angle $\phi$ is approximately 60 degrees, that is, if the angle $\phi$ is 50 degrees or greater and 70 degrees or smaller, i.e., $50°\le\phi\le70°$. In this state, the angle formed by a center line of the first groove portions 21a and a center line of the first pin 20a in contact with the first contact portion 22a is 15 degrees, and the angle formed by a center line of the second groove portions 21b and a center line of the second pin 20b in contact with the second contact portion 22b is 15 degrees. Therefore, by arranging the first pin 20a and the second pin 20b so that angle $\phi$ is approximately 60 degrees in a state where the first pin 20a and the second pin 20b are respectively engaged with the first surface 23a and the third surface 23b, fluctuation of retard pressure can be sufficiently suppressed and conveyance failure of sheets can be reduced. It is effective to approximate angle $\phi$ to 60 degrees as much as possible to maximize the effect of suppressing fluctuation of retard pressure.

The present invention is not limited to the embodiment described above, and it can be implemented in various forms other than the example described above. Various components can be omitted, replaced or changed within the scope of the present invention. Dimensions, materials, shapes and relative arrangements of components can be varied according to the configuration of the apparatus or various conditions in applying the present invention.

The above embodiment described an example where the first pin 20a (refer to FIG. 4) is provided on the drive shaft 17 and the first groove portions 21a are formed on the joint member 30, but the present invention is not limited to this example. The positional relationship of the first pin 20a and the first groove portions 21a can be opposite. That is, the first pin 20a can be provided on the joint member 30 and the first groove portions 21a can be provided on the drive shaft 17. The same applies for the second pin 20b and the second groove portions 21b. That is, the second pin 20b can be provided on the joint member 30 and the second groove portions 21b can be provided on the retard shaft 16.

The above-described embodiment illustrated a case where the first pin 20a and the second pin 20b are cylindrical, but the present invention is not limited to this example. For example, instead of the first pin 20a, a rib extending in the axial direction of the drive shaft 17 and capable of engaging with the first groove portions 21a can be provided. Further, instead of the second pin 20b, a rib extending in the axial direction of the retard shaft 16 and capable of engaging with the second groove portions 21b can be provided.

The above-described embodiment also illustrated a case where the first groove portions 21a and the second groove portions 21b are groove shaped, but the present invention is not limited to this example. For example, the first groove portions 21a and the second groove portions 21b can be a long hole that extends in a second axial direction. Further, one of the first groove portions 21a and the second groove portions 21b can be a groove and the other can be a long hole.

According to the above-described embodiment, the uppermost sheet P of the sheets P stacked inside the cassette 1 (refer to FIG. 1) is fed by the feed roller 10, but the present invention is not limited to this example. The conveyance roller 11 can also function as the feed roller 10. That is, the printer 100 can be configured without the feed roller 10 and configured so that the conveyance roller 11 picks up the uppermost sheet P from the sheets P stacked inside the cassette 1 and coveys the sheet P toward the image forming unit 200.

According to the embodiment described above, the printer 100 was described as an example of the image forming apparatus, but the present invention can also be applied to an ink-jet type image forming apparatus in which inks are injected through nozzles to form images on sheets.

OTHER EMBODIMENTS

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-108092, filed Jun. 5, 2018, which is hereby incorporated by reference herein in its entirety.

What is claimed is:

1. A sheet feeding apparatus comprising:
a conveyance roller configured to convey sheets;
a retard roller configured to contact the conveyance roller and separate sheets one by one;
a drive input shaft driven by a driving source;
a retard shaft configured to support the retard roller rotatably;
a joint configured to connect the retard shaft with the drive input shaft, and transmit rotary drive force of the drive input shaft to the retard shaft;
a first pin provided on either one of the drive input shaft or the joint;
a first groove portion provided on the other of the drive input shaft or the joint, and configured to engage with the first pin at a first engagement position in response to a rotation of the drive input shaft;
a second pin provided on either one of the retard shaft or the joint; and
a second groove portion provided on the other of the retard shaft or the joint, and configured to engage with the second pin at a second engagement position in response to a rotation of the joint,
wherein when viewed in an axial direction of the joint, a straight line that passes through the first engagement position and a center of rotation of the drive input shaft is defined as a first straight line, a straight line that passes through the second engagement position and a center of rotation of the retard shaft is defined as a second straight line, an angle formed by the first straight line and the second straight line is defined as a first angle, a straight line that passes through the center of rotation of the drive input shaft and an axis of the first pin is defined as a third straight line, a straight line that passes through the center of rotation of the retard shaft and an axis of the second pin is defined as a fourth straight line, and an angle formed by the third straight line and the fourth straight line is defined as a second angle,
wherein in a state where the first pin and the second pin are respectively engaged with the first groove portion and the second groove portion, the first angle is within a range of 80 degrees or greater and 100 degrees or smaller, and the second angle is within a range of 50 degrees or greater and 70 degrees or smaller.

2. The sheet feeding apparatus according to claim 1, wherein the first pin is provided on the drive input shaft, the second pin is provided on the retard shaft, and the first groove portion and the second groove portion are respectively provided on a first end portion and a second end portion in the axial direction of the joint.

3. The sheet feeding apparatus according to claim 2, wherein the first groove portion comprises a first surface and a second surface that extend in the axial direction of the joint and that are opposed to one another interposing the first pin,
the second groove portion comprises a third surface and a fourth surface that extend in the axial direction of the joint and that are opposed to one another interposing the second pin,
the first surface is positioned downstream of the second surface in a direction of rotation of the joint and engaged with the first pin at the first engagement position, and
the third surface is positioned upstream of the fourth surface in the direction of rotation of the joint and engaged with the second pin at the second engagement position.

4. The sheet feeding apparatus according to claim 3, wherein the first engagement position is positioned at a boundary part between the first surface and an outer peripheral surface of the joint, and
the second engagement position is positioned at a boundary part between the third surface and the outer peripheral surface of the joint.

5. The sheet feeding apparatus according to claim 1, wherein each of the first pin and the second pin is formed in a cylindrical shape.

6. The sheet feeding apparatus according to claim 1, wherein the sheet feeding apparatus further comprises a torque limiter interposed between the retard roller and the retard shaft, and
the drive input shaft, the joint and the retard shaft are rotated only in one direction by driving force of the driving source.

7. The sheet feeding apparatus according to claim 1, wherein an axial direction of the drive input shaft and the axial direction of the joint mutually intersect.

8. An image forming apparatus comprising:
the sheet feeding apparatus according to claim 1; and
an image forming unit configured to form an image on a sheet fed from the sheet feeding apparatus.

* * * * *